P. C. CHIPRON.
Harvester Rake.

No. 55,060.

2 Sheets—Sheet 1.

Patented May 29, 1866.

WITNESSES:

INVENTOR.

P. C. CHIPRON.
Harvester Rake.

No. 55,060.

2 Sheets—Sheet 2.

Patented May 29, 1866.

WITNESSES:

INVENTOR.

UNITED STATES PATENT OFFICE.

P. CHARLES CHIPRON, OF HIGHLAND, ILLINOIS.

IMPROVEMENT IN HARVESTER-RAKES.

Specification forming part of Letters Patent No. 55,060, dated May 29, 1866.

*To all whom it may concern:*

Be it known that I, P. CHARLES CHIPRON, of Highland, in the county of Madison and State of Illinois, have invented a new and Improved Automatic Raking Attachment for Harvesters; and I do hereby declare that the following is a full, clear, and exact description thereof, which will enable others skilled in the art to make and use the same, reference being had to the accompanying drawings, forming part of this specification, in which—

Figure 1:
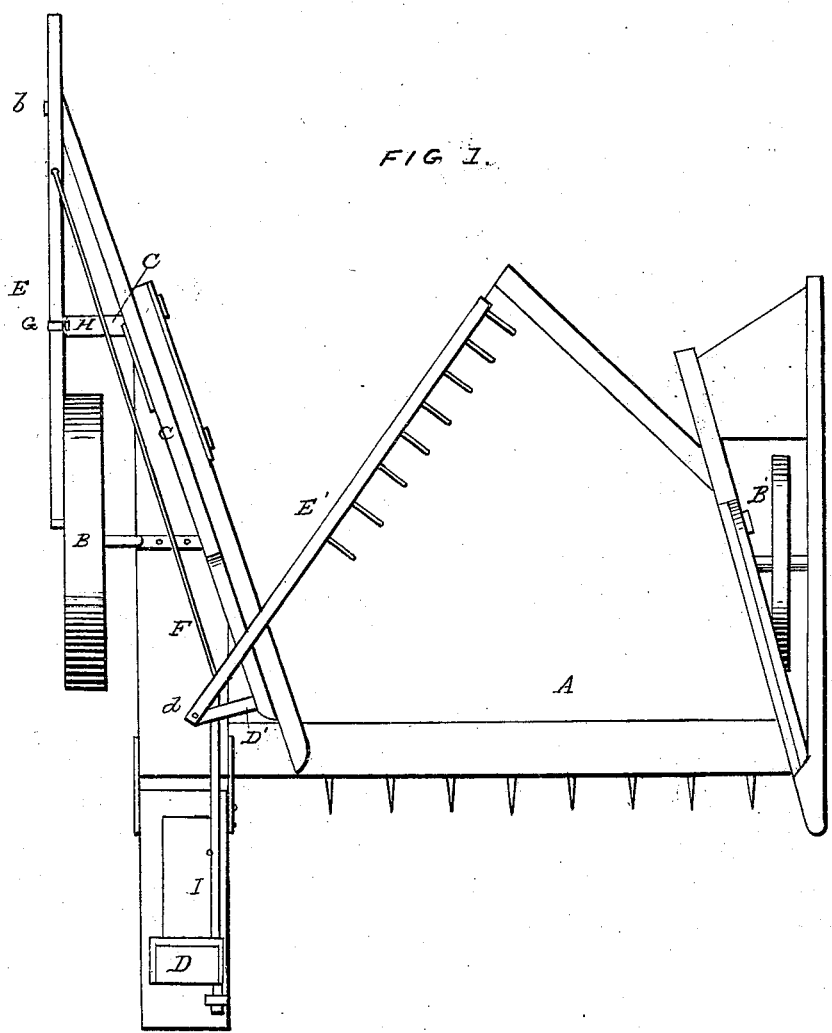
Figure 2:
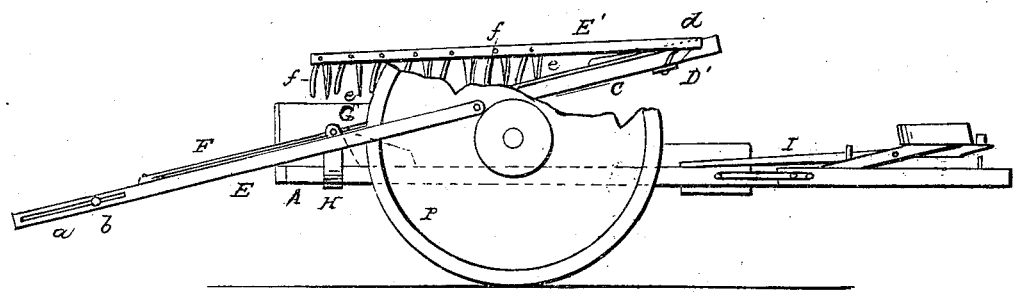
Figure 3:
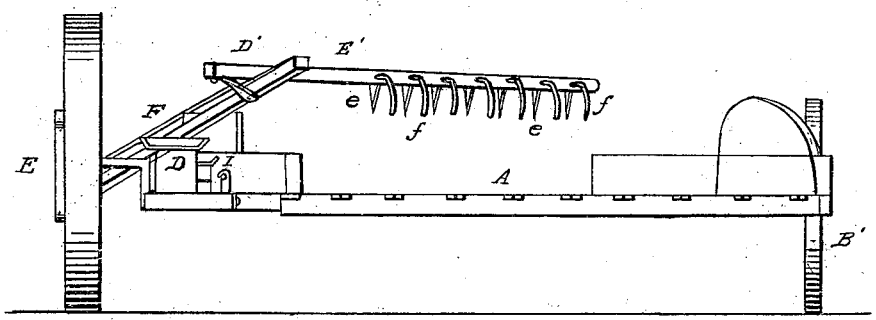

Figure 1, Sheet No. 1, is plan or top view of my invention; Fig. 2, Sheet No. 2, a side view of the same; Fig. 3, a front view of the same Similar letters of reference indicate like parts.

A represents the platform of a harvester, supported by two wheels, B B', and having the usual reciprocating sickle at its front end.

D represents the driver's seat, which is at the rear part of the piece to which the draft-pole is attached, and E is a sliding bar, the front end of which is attached to the wheel B at a suitable distance from its center. The rear part of this bar has a slot, *a*, made longitudinally in it, through which a pin, *b*, passes, said pin projecting horizontally from the rear part of a bar, C, which is secured to the frame of the harvester by a pivot-bolt, *c*.

The front part of the bar C has an arm, D', projecting laterally from it, to which arm the outer end of a rake-bar, E', is secured by a pivot-bolt, *d*, and the rake-bar near this pivot-bolt has a rod, F, connected to it the rear end of said rod being attached to the rear part of the sliding bar E.

G is a friction-roller which bears upon the upper surface of the sliding bar E at the rear part of the wheel B, said roller having its axis on an arm, H, attached to the framing of the harvester.

The rake-bar rests and works upon the front part of the bar C, and said rake-bar has two sets of teeth, *e f*, attached to it, one set, *e*, being of the ordinary straight kind, and the other set, *f*, being of curved wire, which extends out in front of the rake-head.

I is a foot-lever, the front end of which is within convenient reach of the foot of the driver on seat D. This lever I extends back underneath the arm D', and the driver at any time, by pressing down the front end of this lever, can throw up the front end of bar C, so as to place the rake beyond the reach of the grain on the platform. This is an important feature of the invention, as in cases where the grain is light the gavels would be too small if the grain were raked from the platform at every revolution of wheel B.

The rake it will be seen is swept across the platform by means of the movement given it from the wheel B by the bar E and rod F, and the rake during its forward movement is elevated, so as not to interfere with the falling grain, by means of the wheel B pressing the front part of the sliding bar E, and consequently the front part, C, upward, the friction-roller G serving as a bearing for E during this upward movement.

The two sets of teeth *e f* prevent the rake from choking or clogging, and the grain will be raked off clean from the platform, while the driver, by means of the lever I, has it within his power to regulate the size of the gavels, rendering them uniform and sufficiently large, however light the standing grain may be.

Having thus described my invention, what I claim as new, and desire to secure by Letters Patent, is—

The combination of the teeth *e*, curved wire teeth *f*, and the rake-head E, arranged and operating in the manner and for the purpose herein specified.

P. CHARLES CHIPRON.

Witnesses:
JOHN BLATTNER,
JOHN MENZ.